A. JENDRUSIK.
LOCOMOTIVE VALVE GEAR.
APPLICATION FILED MAY 27, 1909.

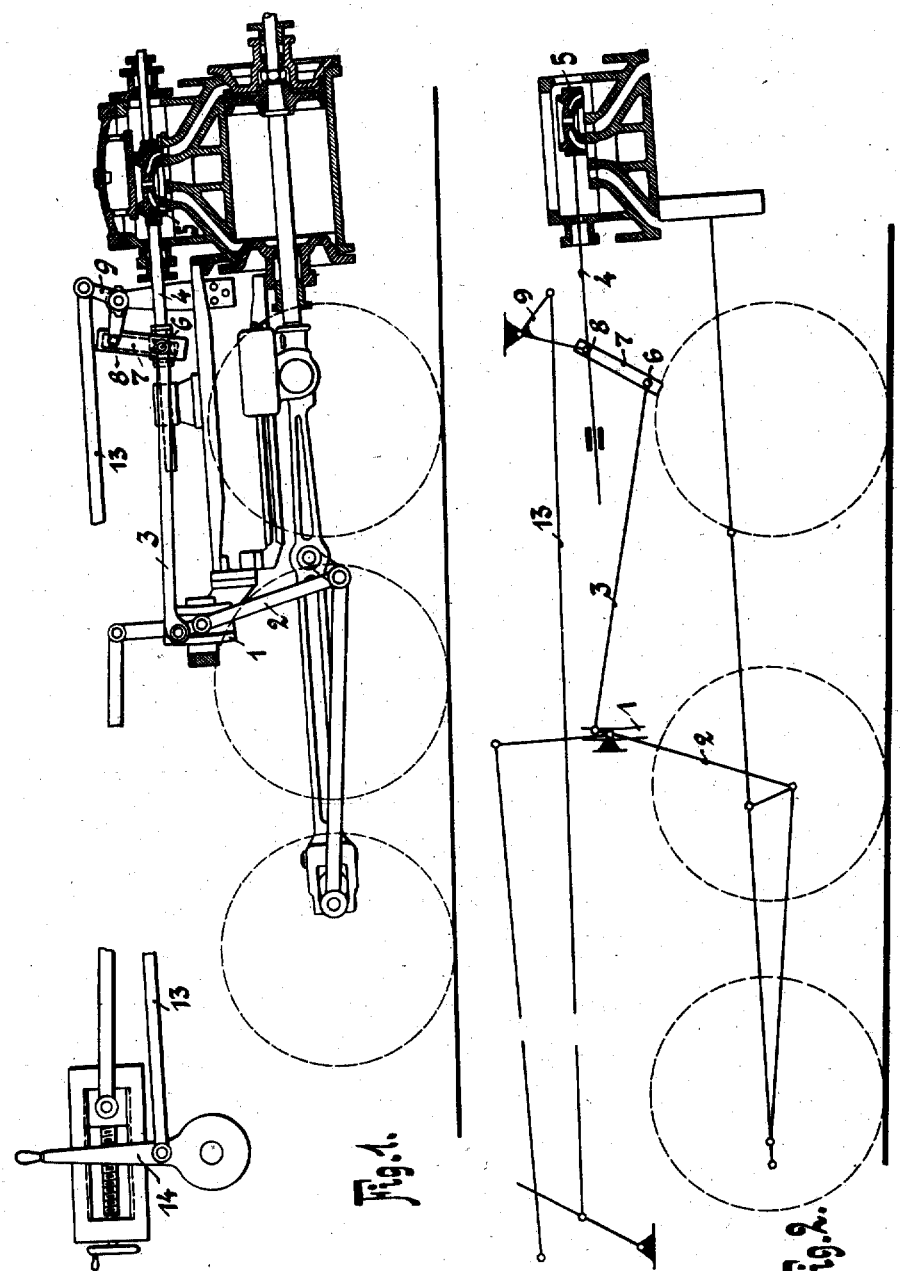

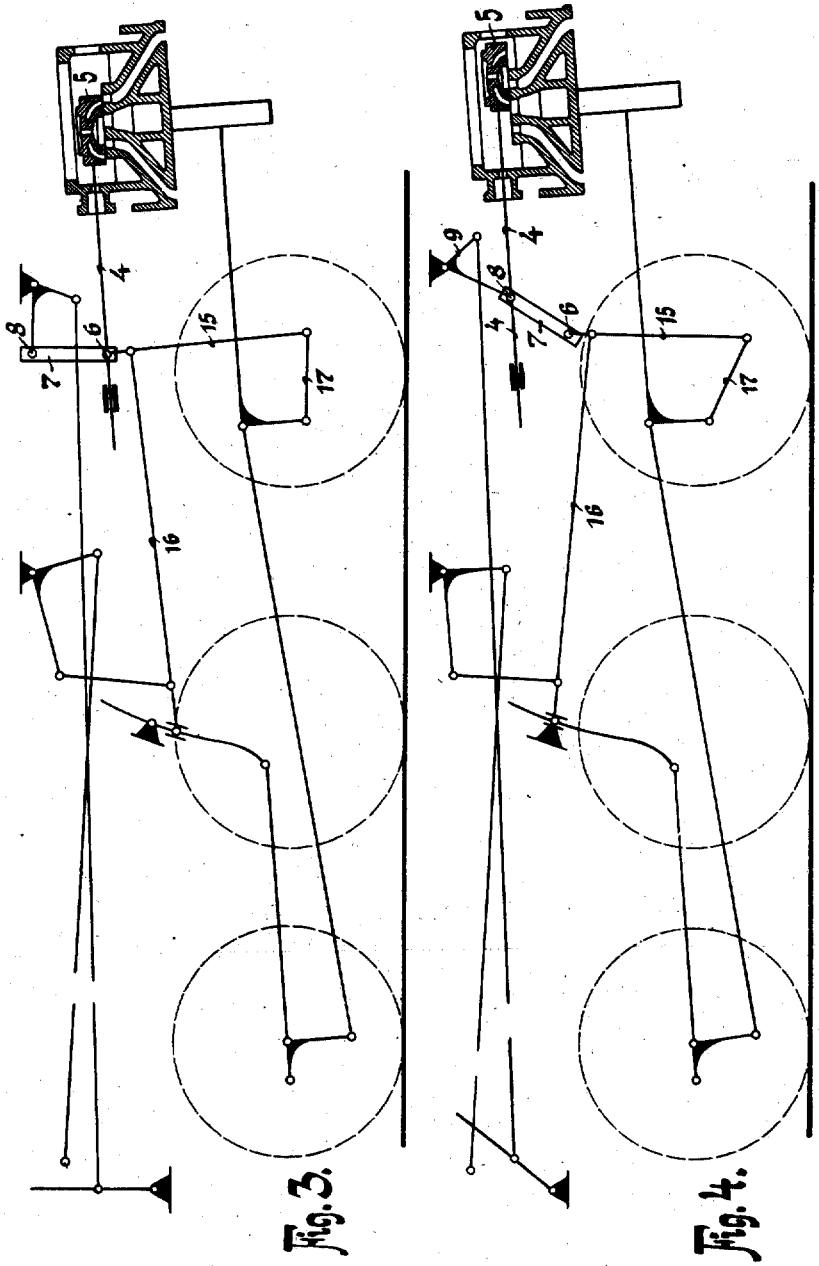

990,656.

Patented Apr. 25, 1911.

3 SHEETS—SHEET 3.

Witnesses:
T. E. Barkley
A. M. Luch

Inventor:
Aurelijusz Jendrusik
by Francis Appleman
Atty

UNITED STATES PATENT OFFICE.

AURELIJUSZ JENDRUSIK, OF STRZOMIESZYCE, RUSSIA.

LOCOMOTIVE VALVE-GEAR.

990,656. Specification of Letters Patent. Patented Apr. 25, 1911.

Application filed May 27, 1909. Serial No. 498,605.

*To all whom it may concern:*

Be it known that I, AURELIJUSZ JENDRUSIK, a subject of the Czar of Russia, and residing at Strzomieszyce, Russian Poland, Empire of Russia, have invented certain new and useful Improvements in Locomotive Valve-Gear, of which the following is a specification.

My invention relates to locomotive valve gears, with which it is possible, when running without steam, and for the purpose of suppressing the compression and expansion and protecting the steam-distributing members, to stop the slide valve and place it in such manner that the cylinder ports are permanently connected with one another and with the exhaust. The known valve gears which answer this purpose are made on the lines of the best known locomotive link motions, necessitate however a substantial alteration of the same, particularly a displacement of the main link driven by the eccentric, it being necessary to provide a movable bearing for the pivot of the main link around which it rocks.

Now a primary object of my invention is to remedy these disadvantages.

In order that my invention may be clearly understood I will now explain the same with reference to the accompanying drawings in which several embodiments are represented by way of example.

In said drawings:—Figure 1 is an elevation, partly in section and having parts broken away, showing one constructional form of my invention as applied to a Joy link motion, and Fig. 2 is a diagram showing the same as in Fig. 1 but with the link moved so that the slide valve remains stationary; Figs. 3 and 4 are diagrams showing a form of my invention applied to a Heusinger link motion, whereas Fig. 5 is a somewhat modified form of the invention in connection with a Heusinger link motion, and Fig. 6 is a horizontal section through the essential part of the constructional form of the invention represented in Fig. 1.

Figure 6:
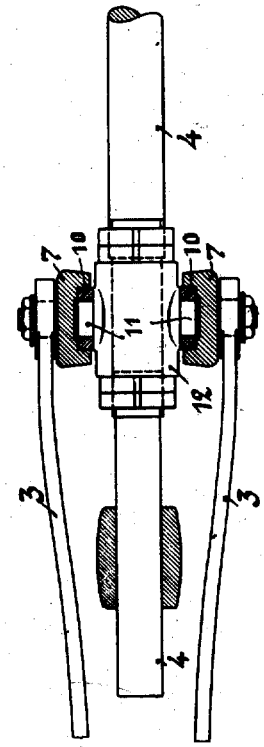

Referring to the drawings and firstly particularly to Figs. 1, 2 and 6, the Joy link motion has a revoluble main link 1, whose guide block has imparted to it by the lever 2 a combined motion from the eccentric and from the coupling bar. This lever 2 is connected with the slide valve rod 4 by the pivoted rod 3. According as the link 1 is slanted more or less, the slide valve 5 moves more or less, more or less steam being admitted to the cylinder. Now according to my invention I attach the rod 3 to the one end 6 of an auxiliary link 7, whereas I preferably suspend the other end 8 of the auxiliary link to an angle lever 9. As clearly shown in Fig. 6, the link 7 has the guide blocks 10 in which the pivots 11 of the sleeve 12 engage, the latter on its part being fixed on the valve rod 4. The rod 13, which is moved from the cab of the engine by the lever 14, serves for moving the link 7 and the bent lever 9. In the position of the link 7 shown in Fig. 1 the bottom end 6 of the same will have motions imparted to it by the rod 3 and will rock around the point 8. Since the guide block 10 (Fig. 6) coincides with the point 6, the valve rod 4 will also move in the same manner as the rod 3 and the slide valve will open and close the cylinder ports in the usual manner. But as soon as the link 7 is moved into the position shown in Fig. 2, the stationary point 8 of the link coincides with the guide block of the valve rod so that the latter does not move at all, whereas the point 6 can rock freely around the point 8. In order to diminish these rocking movements as much as possible it is preferable to place the main link 1 at zero admission. As is evident, the point 8 of the link 7 is suspended in such manner that when the link is moved this point moves to the right, whereupon the slide-valve takes up the position shown in Fig. 2 in which the cylinder ports are connected with one another and with the exhaust.

Figure 5:
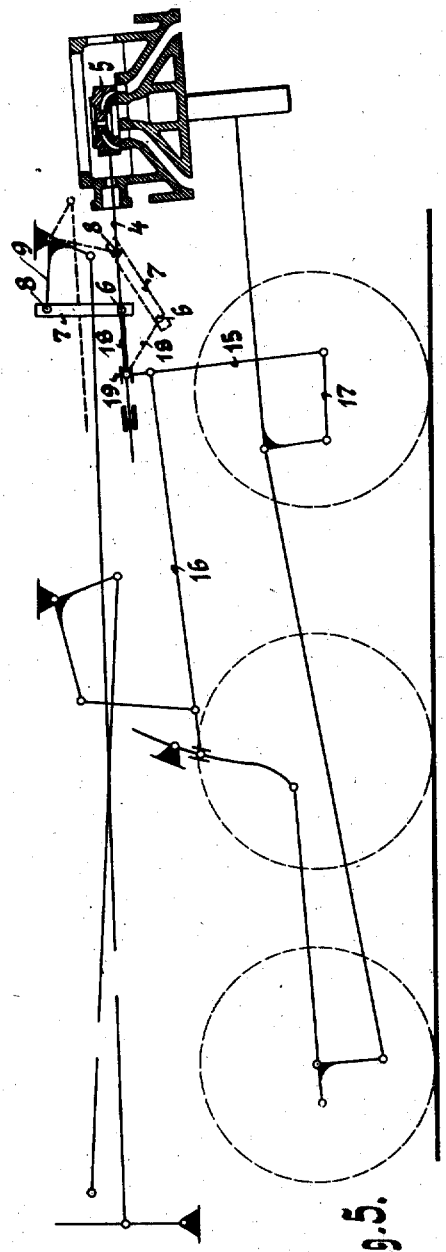

It is true that the Heusinger link motion illustrated in Figs. 3 to 5 differs very materially from the Joy link motion, nevertheless the auxiliary device according to my present invention shown here perfectly corresponds with that employed in the Joy link motion. The upper end of the rod 15 is not connected directly with the valve rod, but is attached by means of bolts to the lower end of the link 7. Again, the other end of link is suspended from the bent lever 9, whereas the guide block of the link is connected with the valve rod. In the position of the link represented in Fig. 3 the manner in which the Heusinger link motion normally operates is not altered in the least and also the motion of the same is imparted without alteration to the slide valve. But as soon as the link 7 takes up the position shown in Fig. 4 the slide valve remains at rest and is placed back so far that the cylinder ports are continuously connected with one another and with the exhaust.

As will be readily understood from Fig. 4, in the position of the link 7 there shown the rods 15, 16 and 17 must be brought out of the position shown in Fig. 3. In order to avoid this, therefore, as is evident from Fig. 5, the lever 15 is not connected directly by the link-bolts 6, but by the pivoted rod 18 with the link 7, whereas the lever 15 is provided with a sleeve 19, as on the valve rod 4, when the link, which takes up the position shown in dotted lines in Fig. 5, can be displaced in this manner.

As is evident without further explanation, in such a link motion it is necessary to shut off steam before the link 7 can be moved into the position shown in Figs. 2 and 4, because otherwise the steam could escape at once through the exhaust port of the valve chest. Consequently, it is preferable to make the throttle lever and the reversing lever dependent one on the other in such manner, by means of one of the known safety devices, that the link can be moved only after the steam has been shut off.

I claim:—

1. In locomotive valve gear of the character described, the combination, of a main link, a slide valve rod, a system of pivotally-connected rods connected with the main link, a pivotally-suspended auxiliary link having one end connected to the system of rods, a guide block movable in the auxiliary link and connected with the slide valve rod, and means for raising and lowering the auxiliary link.

2. In locomotive valve gear of the character described, the combination of a main link, a slide valve rod, a system of pivotally-connected rods connected with the main link, an auxiliary link having one end connected to the system of rods, a guide block movable in the auxiliary link and connected with the valve rod, a laterally suspended lever pivotally carrying the auxiliary link, and manually-operated means for rocking said lever.

In testimony whereof, I affix my signature in the presence of two witnesses.

AURELIJUSZ JENDRUSIK.

Witnesses:
CYRIL TREDNICK,
THOMAS MILS.